United States Patent [19]
Tsuchihashi et al.

[11] Patent Number: 5,404,290
[45] Date of Patent: Apr. 4, 1995

[54] ROBOTIC MANIPULATOR INCLUDING A FAILURE DETECTING CIRCUIT FOR PROHIBITING A MOVABLE SECTION FROM BEING DRIVEN

[75] Inventors: Akira Tsuchihashi; Yoshishige Nakazawa; Yasushi Watanabe; Imazawa Kanji; Kazuyuki Watanabe, all of Tokyo, Japan

[73] Assignee: Nitto Kohki Co., Ltd., Tokyo, Japan

[21] Appl. No.: 165,888

[22] Filed: Dec. 14, 1993

[30] Foreign Application Priority Data

Dec. 18, 1992 [JP] Japan .................. 4-339330

[51] Int. Cl.6 .............................................. G06F 15/46
[52] U.S. Cl. ................................ 364/167.01; 364/184; 364/190; 395/99; 901/8
[58] Field of Search .................. 364/184–187, 364/167.01, 193, 190, 174; 395/99, 80–97; 901/3, 4, 8, 9, 15, 49; 318/568.1–568.25; 414/730, 909, 1–8

[56] References Cited

U.S. PATENT DOCUMENTS

| | | | |
|---|---|---|---|
| 3,920,972 | 11/1975 | Corwin et al. | 235/151 |
| 4,763,055 | 8/1988 | Daggett et al. | 318/368 |
| 4,786,847 | 11/1988 | Daggett et al. | 318/568 |
| 4,807,153 | 2/1989 | Onaga et al. | 364/513 |
| 4,865,514 | 12/1989 | Tsuchihashe et al. | 414/736 |
| 5,020,475 | 6/1991 | Crabb et al. | 118/719 |
| 5,038,089 | 8/1991 | Szakaly | 318/568.11 |
| 5,105,367 | 4/1992 | Tsuchihashi et al. | 395/99 |
| 5,116,180 | 5/1992 | Fung et al. | 414/5 |
| 5,182,557 | 1/1993 | Lang | 341/20 |
| 5,206,825 | 4/1993 | Takagi et al. | 364/746.2 |
| 5,227,973 | 7/1993 | Marcantonio | 364/424.02 |
| 5,270,627 | 12/1993 | Rehse | 318/575 |

*Primary Examiner*—Paul P. Gordon
*Assistant Examiner*—Cameron H. Tousi
*Attorney, Agent, or Firm*—Nixon & Vanderhye

[57] ABSTRACT

A safety operation system for a manipulator is provided with a first operation section. The first operation section has a first movable section, and outputs a first operation signal representing the position and angle of the first movable section. A failure detecting section detects failure of the first operation section on the basis of the first operation signal, and outputs a detection signal. When failure of the first operation section is not detected, a conversion section converts the first operation signal into a control signal. A second operation section has a second movable section which moves in accordance with movement of the first movable section, and outputs a second operation signal generated in accordance with movement of the second movable section. A comparison section compares the control signal with the second operation signal, and outputs a deviation signal used for opening the second movable section. A management section receives the detection signal, and supplies the comparison section with a signal for making deviation signal zero, thereby prohibiting the second movable section from being driven. A display section displays data on the failure of the first operation section and/or data on the current position of the first movable section, on the basis of a signal output from the management section.

7 Claims, 7 Drawing Sheets

FIG. 2A A-PHASE 
FIG. 2B B-PHASE 
FIG. 2C a 
FIG. 2D b 
FIG. 2E c 
FIG. 2F d 
FIG. 2G U OUTPUT 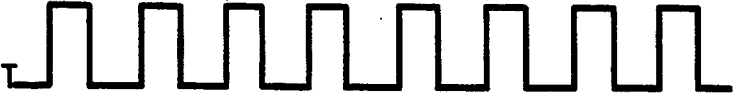

FIG. 3A A-PHASE 
FIG. 3B B-PHASE 
FIG. 3C a 
FIG. 3D b 
FIG. 3E c 
FIG. 3F d 
FIG. 3G D OUTPUT 

ROBOTIC MANIPULATOR INCLUDING A FAILURE DETECTING CIRCUIT FOR PROHIBITING A MOVABLE SECTION FROM BEING DRIVEN

BACKGROUND OF THE INVENTION

1. Field of the Invention

The present invention relates to a controller for controlling a manipulator including an industrial robot or the like. More particularly, the present invention relates to a safety operation system for a manipulator, which permits the operator to manually operate the manipulator in safety while simultaneously looking at a display that shows how the manipulator is moving in response to the operator's manual operation.

2. Description of the Related Art

In general, an industrial robot has such a structure as is shown in FIG. 5.

Referring to FIG. 5, numeral 100 denotes a control panel which stores positional information, working condition information, etc., and which plays back the information.

Numeral 200 denotes a teaching box (T-BOX) which teaches a moving direction, a moving distance, a working condition, etc. to the control panel 100. Conventionally, the teaching box 200 has such a structure as is shown in FIG. 6. In FIG. 6, numeral 201 denotes a step number display section for displaying step numbers respectively assigned to teaching steps.

Numeral 202 in FIG. 6 denotes a teaching item selection switch used for designating an item of teaching. The teaching items selectable by the teaching item selection switch 202 correspond to functions of the robot's main body 300. For example, the moving conditions, such as a target position, a linear movement, a circular movement, etc., and the working conditions can be designated by the teaching item selection switch 202.

Numeral 203 denotes a manual switch used for individually controlling the directions of axes of the robot's main body 300 at the time of teaching. In the case where a rectangular robot is controlled, the manual switch 203 is provided with a movement instruction switch used for moving the X, Y and Z axes and moving the $\theta$ and $\Psi$ axes of a wrist. In the case where an articulated robot is controlled, such as that depicted in FIG. 5, the manual switch 203 is provided with a movement instruction switch used for moving the axis of swing and moving the $\theta$ and $\Psi$ axes of a lower arm, an upper arm and a wrist.

Numeral 204 denotes a teaching push button switch, and numeral 205 denotes a storage instruction switch used for supplying the information determined by the teaching operation to the control panel and for storing the information in the control panel.

Numeral 206 denotes a display lamp for displaying the teaching item selected.

Turning back to FIG. 5, Numeral 300 denotes the robot's main body. The operation of the robot's main body 300 is determined by the instructions supplied from the teaching box 200, or by the driving instructions obtained by performing predetermined processing with respect to the information which are read out from the control panel 100 at the time of a playback operation.

FIG. 7 shows an example of a control device. In the control device shown in FIG. 7, the teaching box is provided with a display section and a display controller.

Referring to FIG. 7, numeral 210 denotes a display section, numeral 211 denotes a display memory section for storing combinations of display characters along with step numbers, and numeral 212 denotes a display controller for reading out storage contents from the display memory section 211 in response to an instruction supplied from either an operation-key section 213 or the control panel 100. The display controller 212 supplies the readout storage contents to the display section 210. When the instruction from the operation-key section 213 is supplied to the display controller 212, the contents of that instruction are first confirmed and determined. Then, the display characters corresponding to the contents of the instruction are read out from the display memory section 21, and the teaching contents are displayed on the display section 210 together with the corresponding step number. The instruction from the operation-key section 213 is supplied also to the control panel 100, so as to drive the robot's main body 300. When the robot's main body 300 is driven, the data on the display section 210 is shifted to the left by one column, and the data on the last and present steps are updated under the control of the display controller 212. To read out a step number for a block operation or for the correction of teaching contents, data on the block operation is entered from the operation-key section 213. Upon entry of the data, a playback operation is executed for each step. In response to this playback operation, the display controller 212 reads out data from the display memory section 211 and controls the display section 210 to shift the display data from right to left so as to permit the teaching contents of the steps to be successively displayed on the display section 210. At the time of an automatic playback operation, the teaching contents are successively displayed in a similar manner on the basis of a step advancing signal supplied from the control panel 100.

In the computer system mentioned above, the teaching box 200 is operated before starting a working operation. To be specific, the robot's main body 300 is manually operated while visually confirming the tip end of the working tool of the robot's main body 300, in such a manner that the tip end of the working tool is moved along a working line of a workpiece. Then, a teaching operation is performed while manually operating the robot's main body. In the teaching operation, the data on the working conditions, in accordance with which the workpiece is worked, and data on the procedures for moving the tip end of the working tool of the robot's main body, are stored in the internal memory means of the control panel 100.

After the end of the teaching operation to the robot's main body, an automatic operation, i.e., a playback operation, is executed on the basis of the data stored in the internal memory means of the control panel 100. In the automatic operation, the control panel 100 reads out the positional data on the working line and the data on the working conditions from the internal memory means, performs predetermined processing with respect to the readout data, and supplies the signals obtained by the processing to the robot's main body as driving signals. Upon reception of the driving signals, the robot's main body 300 performs a playback operation in such a manner that the tip end of the working tool moves exactly in the same way as instructed in the teaching operation.

When the manual operation of the robot's main body is required, the operator operates the manual switch 203 and the operation-key section 213.

A conventional manipulator has such a structure as is shown in FIG. 8. (An example of such a structure is disclosed in Japanese Patent Application KOKAI Publication No. 2-198778, for example.)

Referring to FIG. 8, reference symbols 514A to 514C denote position sensors provided at the joints of a master arm 501. The signals of position sensors 514A to 514C are processed by a master arm input/output device 504 and are then supplied to a central processing unit 505. Reference symbols 515A to 515C denote position sensors provided at the joints of a slave arm 502. The signals of position sensors 515A to 515C are processed by a slave arm input/output device 506 and are then supplied to the central processing unit 505.

The central processing unit 505 converts the signals of the position sensors into signals for use in generalized coordinates. In addition, the central processing unit 505 receives instructions from a coordinates conversion-adding device 518 and converts them into signals for use in second generalized coordinates, thus determining designation values to be supplied to the slave arm 502. Signals representing the designation values are supplied from the central processing unit 505 to the slave arm input/output device 506, so as to drive actuators 516A to 516C provided at the joints of the slave arm 502.

Simultaneously, the central processing unit 505 supplies signals to an animation simulator 511, so as to control a graphic display 512 to display an animation image of the slave arm 502.

Reference symbols 517A to 517C in FIG. 8 denote position sensors for sensing the angle of a joy stick 507. The signals of position sensors 517A to 517C are processed by a joy stick input/output device 508 and are then supplied to the central processing unit 505. When determining instructions to the slave arm 502, the central processing unit 505 determines which signals, namely signals supplied from the master arm 501 or signals supplied from the joy stick 507, should be referred to, on the basis of a switching signal externally supplied to the central processing unit 505.

An image entered by an image input device 509 is supplied to an image processing device 510, and the image processing device 510 performs an FFT arithmetic operation and pattern identification are performed with respect to the supplied image, such that a real image is displayed on a TV monitor 513. The real image is supplied also to the animation simulator 511. When necessary, the real image is superimposed on the animation image displayed on the graphic display 512.

As can be understood from the above, the operator can operate the master arm 501 while simultaneously looking at the slave arm 502 displayed on the TV monitor 513. The operator operates the slave arm 502, with the movement of the slave arm 502 sensed by position sensors 514A to 514C and with the signals of the position sensors converted into operation signals by the central processing unit 505.

In the conventional teaching box for industrial robots, the keys have a play, and do not produce signals unless they are fully depressed.

In the conventional safety operation system for industrial robots, some of the keys are provided with small-sized return springs. Since the keys may not reliably return to their original positions after they are depressed, the operator is not always sure whether or not instructions have been accurately supplied to the robot's main body by operating the keys.

If something is wrong with position sensors 514A to 514C in the conventional safety operation system, erroneous signals are supplied to the slave arm 502 even when the master arm 501 is operated accurately. In this case, the slave arm 502 does not move in the manner intended by the operator. Since the operator cannot understand the reason for the unintended movement of the slave arm 502, the operator may feel uneasy during the operation.

SUMMARY OF THE INVENTION

Accordingly, an object of the present invention is to provide a safety operation system for a manipulator, which permits the operator to manually operate the manipulator in safety while simultaneously looking at a display that shows how the manipulator is moving in response to the operator's manual operation.

To achieve this object, the present invention includes a failure detecting circuit responsive to a first operation signal produced from a first manually movable section of a manipulator for detecting failures in the first movable section and a safety management device responsive to the detection of a failure for prohibiting a second movable manipulator section from being driven, as well as for controlling the display of data related to the failure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A to 2G show output signals which are produced when the encoder of the safety operation system depicted in FIG. 1 is rotated to the right;

FIGS. 3A to 3G show output signals which are produced when the encoder of the safety operation system depicted in FIG. 1 is rotated to the left;

DETAILED DESCRIPTION OF THE PREFERRED EMBODIMENTS

Embodiments of the present invention will now be described.

Figure 1:
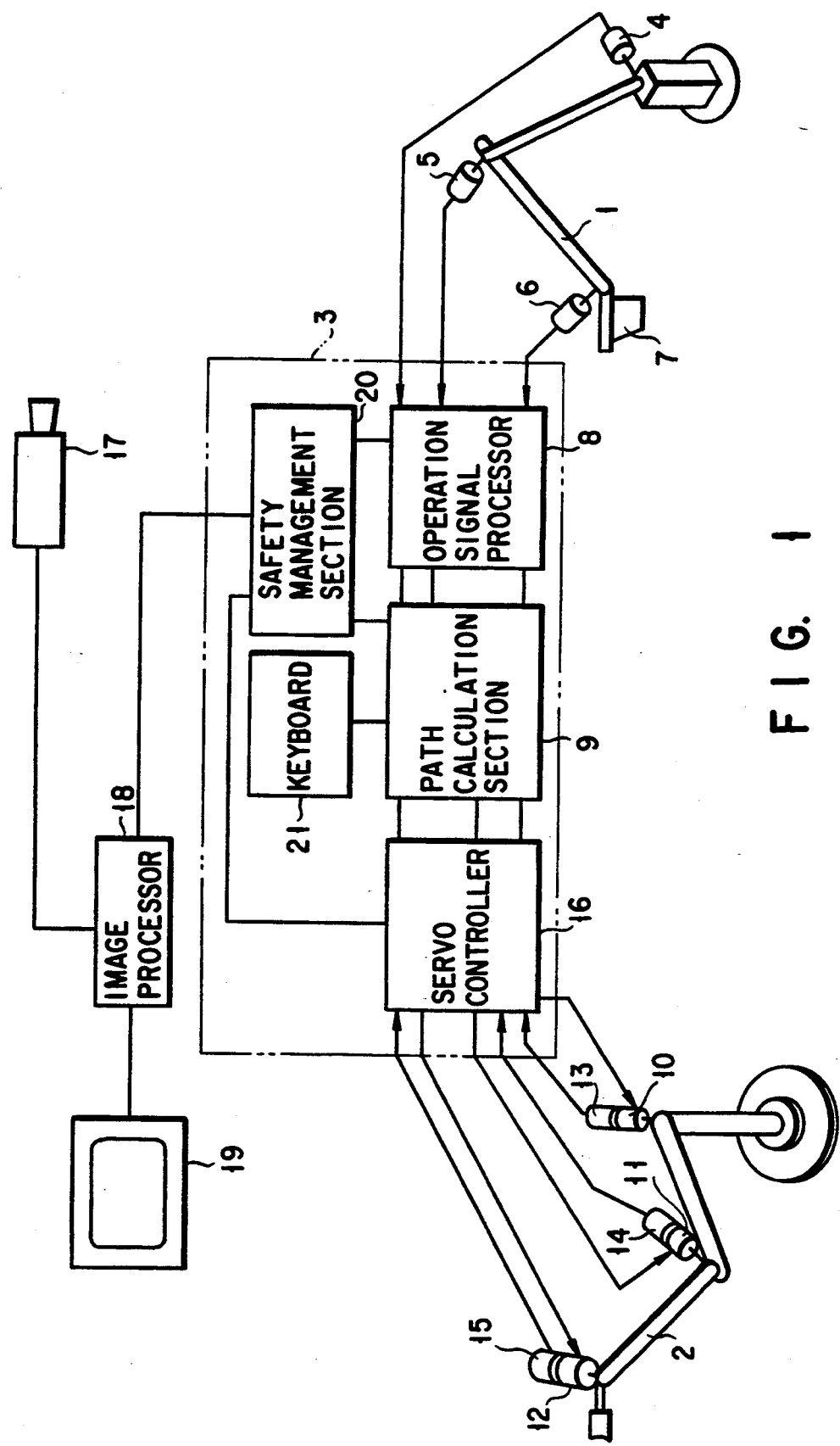
FIG. 1 is a diagram showing the configuration of the safety operation system for a manipulator according to one embodiment of the present invention.

FIG. 1 is a diagram showing the safety operation system for a manipulator according to the first embodiment of the present invention.

Referring to FIG. 1, numeral 1 denotes a master arm, and numeral 2 denotes a slave arm having a different shape from that of the master arm 1.

Numeral 3 denotes a manipulator controller, which performs coordinate conversion so as to move the slave arm 2 in accordance with the movement of the master arm 1. Although each of the master and slave arms 1 and 2 has 6 degrees of freedom in practice, descriptions below will be simplified by referring to the case where each arm has 3 degrees of freedom.

Numerals 4, 5 and 6 denote position sensors attached to the movable sections (or the degree of freedom) of the master arm 1, and numeral 7 denotes a grip attached to the tip end of the master arm 1. When the operator moves the master arm 1 while taking hold of the grip 7, the position sensors 4, 5 and 6 attached to the movable sections of the master arm 1 move, and signals representing the moving directions and distances of the position sensors 4, 5 and 6 are supplied to a manipulator controller 3.

Numeral 8 denotes an operation signal processor. The operation signal processor 8 performs failure detection and phase discrimination on the basis of the signals output from the position sensors 4, 5 and 6, and then counts the number of output pulses.

Numeral 9 denotes a path calculation section. Upon reception of the count of the output pulses from the operation signal processor 8, the path calculation section 9 carries out predetermined calculation in consideration of the geometrical shapes of the master and slave arms 1 and 2 such that the tip ends of the arms 1 and 2 move along similar paths, and then outputs control signals.

Even though the master arm 1 and the slave arm 2 are different in structure, control signals are supplied to actuators 10, 11 and 12 attached to the movable sections of the slave arm 2 in such a manner that the tip end of the slave arm 2 moves along a path similar to that of the grip 7 at the tip end of the master arm 1.

Position sensors 13, 14 and 15 are coupled to the actuators 10, 11 and 12, respectively. These position sensors sense the moving directions and distances of the respective actuators 10, 11 and 12.

Numeral 16 denotes a servo controller. The servo controller 16 amplifies control signals supplied from the path calculation section 9 and supplies the amplified control signals to the actuators 10, 11 and 12. In addition, the servo controller 16 receives feed-back signals from the position sensors 13, 14 and 15, compares them with the control signals from the path calculation section 9, and outputs deviation signals.

Numeral 17 denotes an image input device located in the vicinity of the tip end of the slave arm 2.

Numeral 18 denotes an image processor, and numeral 19 denotes a graphic display. The graphic display 19 is located in the neighborhood of the master arm 1 and displays the output signals from the image processor 18. When operating the master arm 1, the operator looks at the graphic display 19 and does not have to pay attention to the movement of the master arm 1.

Numeral 20 denotes a safety management section for managing the output signals of the operation signal processor 8, the path calculation section 9 and the servo controller 16. When the safety management section 20 receives these output signals, it prohibits the slave arm 2 from being driven or performs other operations for safety.

Numeral 21 denotes a keyboard. From this keyboard, an instruction for changing the movements of the master and slave arms 1 and 1 in accordance with the coordinates of a workpiece is entered. The instruction entered from the keyboard 21 is supplied to the path calculation section 9.

A description will now be given of the operation of the first embodiment.

When the operator moves the master arm 1 while taking hold of the grip 7 at the tip end of the master arm 1, the position sensors 4, 5 and 6 operate, and signals representing the moving directions and distances are supplied to the operation signal processor 8 as instruction signals. On the basis of the signals, the operation signal processor 8 performs failure detection and phase discrimination. When no failure is detected, the signals are supplied to the path calculation section 9 as output pulses.

If failure is detected, a failure detection signal is supplied to the safety management section 20. Upon reception of the failure detection signal, the safety management section 20 supplies the contents of the failure to the image processor 18, and characters indicating the contents of the failure are superimposed on the image of the slave arm 2 displayed on the graphic display 19. Further, the safety management section 20 prevents the output pulses from being supplied from the operation signal processor 8 to the path calculation section 9. Still further, the safety management section 20 supplies the servo controller 16 with a signal for making the deviation signals of the servo controller 16 zero, thereby prohibiting the slave arm 2 from being driven. The failure detection made by the operation signal processor 8 will be described later with reference to FIGS. 2A to 2G and FIGS. 3A to 3G.

When no failure is detected, the path calculation section 9 performs coordinates conversion with respect to the output pulses received from the operation signal processor 8, such that the tip end of the master arm 1 and the tip end of the slave arm 2 can move along similar paths. Control signals, obtained by the coordinates conversion, are supplied to the servo controller 16.

When the movement ratio between the master arm 1 and the slave arm 2 must be varied or when the origin of the coordinates must be shifted, an instruction is entered from the keyboard 21. The entered instruction is supplied to the path calculation section 9, and the path calculation section 9 performs second coordinates conversion on the basis of the new origin of the coordinates.

The servo controller 16 amplifies the control signals supplied from the path calculation section 9 so that the actuators 10, 11 and 12 can be operated thereby.

In the servo controller 16, the feedback signals from the position sensors 13, 14 and 15 are compared with the control signals from the path calculation section 9. If they are deviated from each other, the signals representing the deviation are amplified and then fed back to the actuators 10, 11 and 12.

As can be understood from the above, the slave arm 2 moves in the manner desired by the operator, on the basis of the signals from both the master arm 1 and the keyboard 21.

To move the master arm 1, the operator takes hold of the grip 7 at the tip end of the master arm 1, and moves the grip 7 while looking at the graphic display 19 showing how the slave arm 2 moves.

If something is wrong with the master arm 1, characters indicating this abnormal condition are displayed on the graphic display 19, thus informing the operator of the abnormal condition. Therefore, the operator can reliably move the master arm 1 as if the operator were moving his or her own arm.

FIGS. 2A to 2G and FIGS. 3A to 3G show A-phase and B-phase output signals produced from the position sensors 4, 5 and 6. The Figures also show output signals which the operation signal processor 8 produces for processing the A-phase and B-phase output signals of the position sensors. The output pulses shown in FIGS. 2A to 2G are produced when the master arm 1 is rotated to the right, while the output pulses shown in FIGS. 3A to 3G are produced when the mater arm 1 is rotated to the left.

Each of the position sensors 4, 5 and 6 is an incremental encoder comprising A-phase and B-phase detecting elements which are arranged with a 90° phase difference. The operation signal processor 8 is provided with monostable multivibrators corresponding to the sensors 4, 5 and 6.

Signal a shown in FIGS. 2C and 3C is a signal output from a monostable multivibrator which operates in response to the rise of the A-phase output signal. Signal b shown in FIGS. 2D and 3D is a signal output from a monostable multivibrator which operates in response to the fall of the A-phase output signal. Signal c shown in FIGS. 2E and 3E is a signal output from a monostable multivibrator which operates in response to the rise of the B-phase output signal. Signal d shown in FIGS. 2F and 3F is a signal output from a monostable multivibrator which operates in response to the fall of the B-phase output signal.

The U-output shown in FIG. 2G is a signal obtained when the master arm 1 is rotated to the right. The U-output comprises four output pulses which are obtained by a logic operation expressed by $(A \cdot c + \overline{A} \cdot d) + (B \cdot b + \overline{B} \cdot a)$ during one rotation of the master arm 1.

The D-output shown in FIG. 3G is a signal obtained when the master arm 1 is rotated to the left. The D-output comprises four output pulses which are obtained by a logic operation expressed by $(A \cdot d + \overline{A} \cdot c) + (B \cdot a + \overline{B} \cdot b)$ during one rotation of the master arm 1.

As long as the position sensors 4, 5 and 6 are in the normal operating condition, the D-output does not have any pulse when pulses are produced in the U-output. Likewise, the U-output does not have any pulse when pulses are produced in the D-output.

Therefore, if both the U-output and D-output have pulses at the same time, this means that the position sensors 4, 5 and 6 are in an abnormal condition. If neither the U-output nor D-output has a pulse, this means that the position sensors 4, 5 and 6 are stationary. Accordingly, the rotation to the right, the rotation to the left, the presence/absence of failure and the stationary state of the position sensors can be determined on the basis of the U- and D-outputs.

Figure 4:
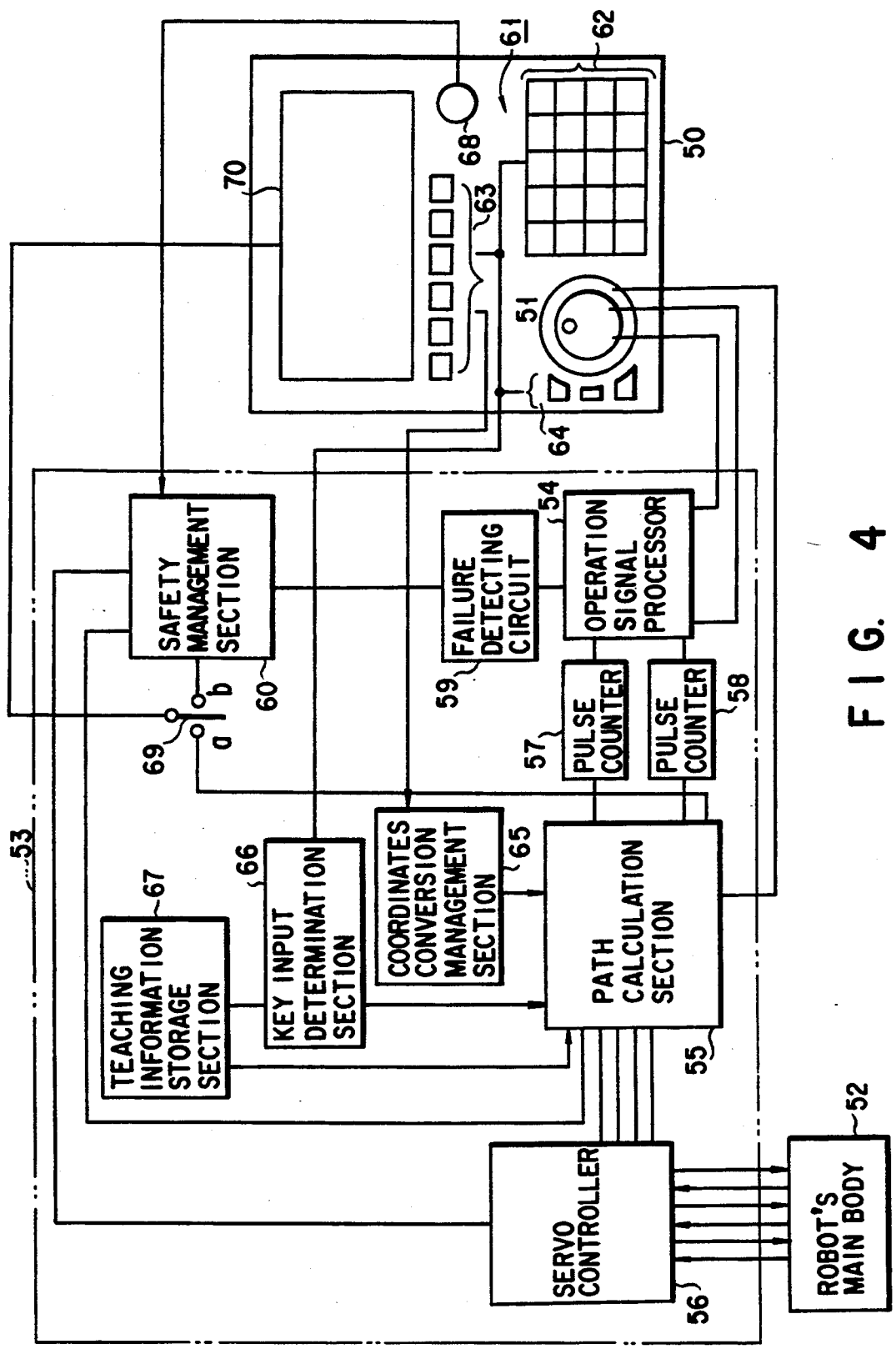
FIG. 4 is a diagram showing the configuration of the safety operation system for a manipulator according to another embodiment of the present invention.
Figure 5:
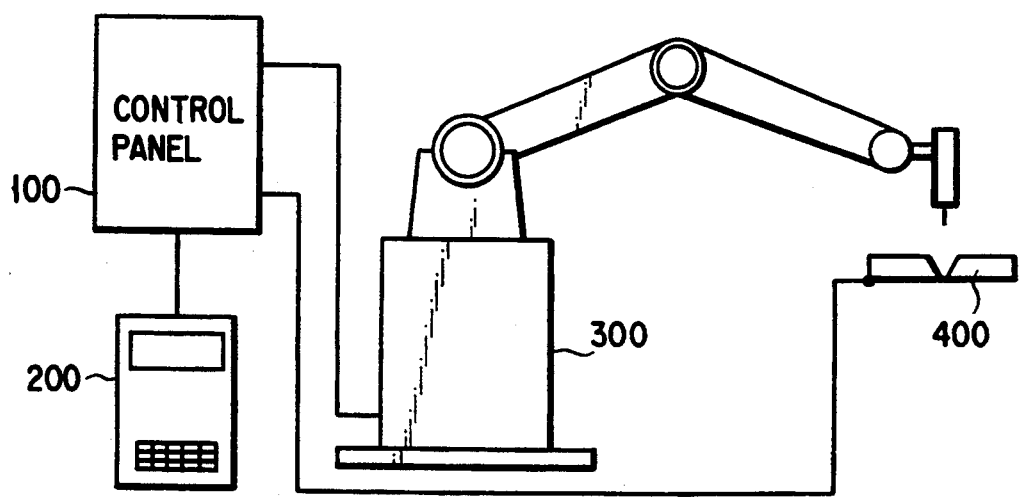
FIG. 5 shows the structure of an industrial robot used in general.
Figure 7:
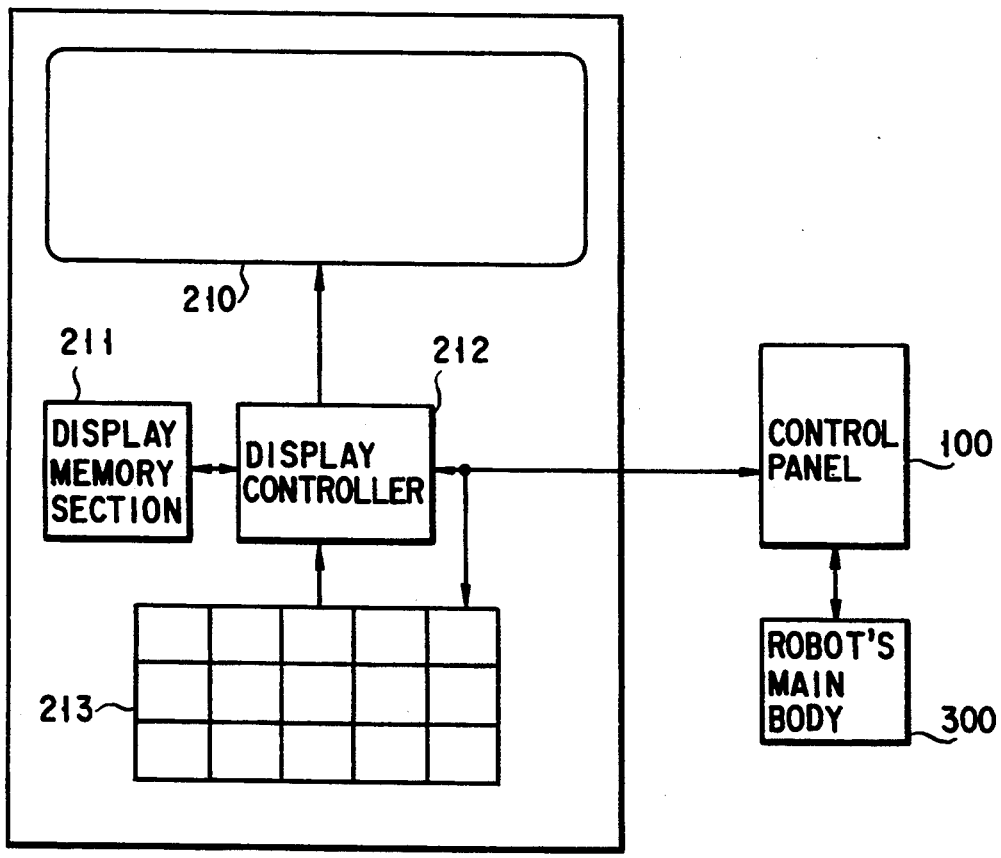
FIG. 7 is also a plan view of a conventional teaching box.
Figure 6:
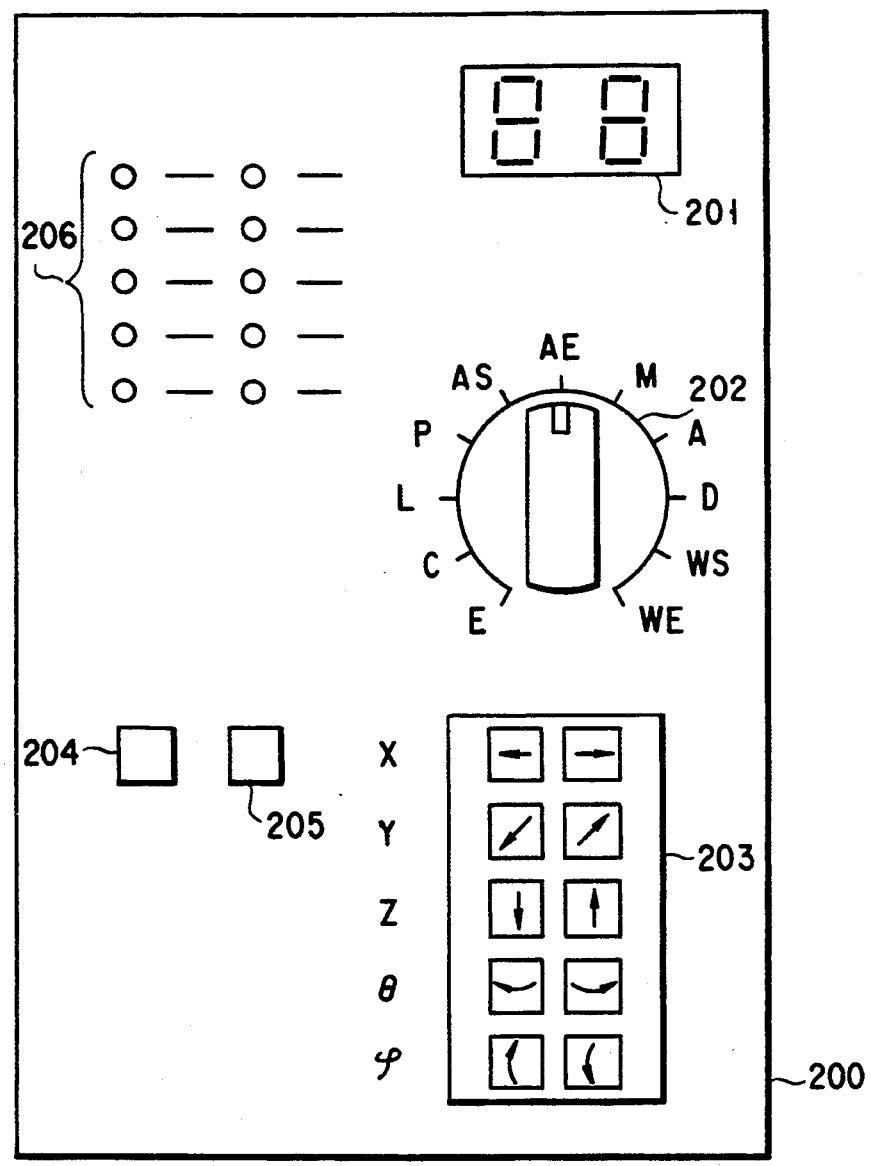
FIG. 6 is a plan view of a conventional teaching box.
Figure 8:
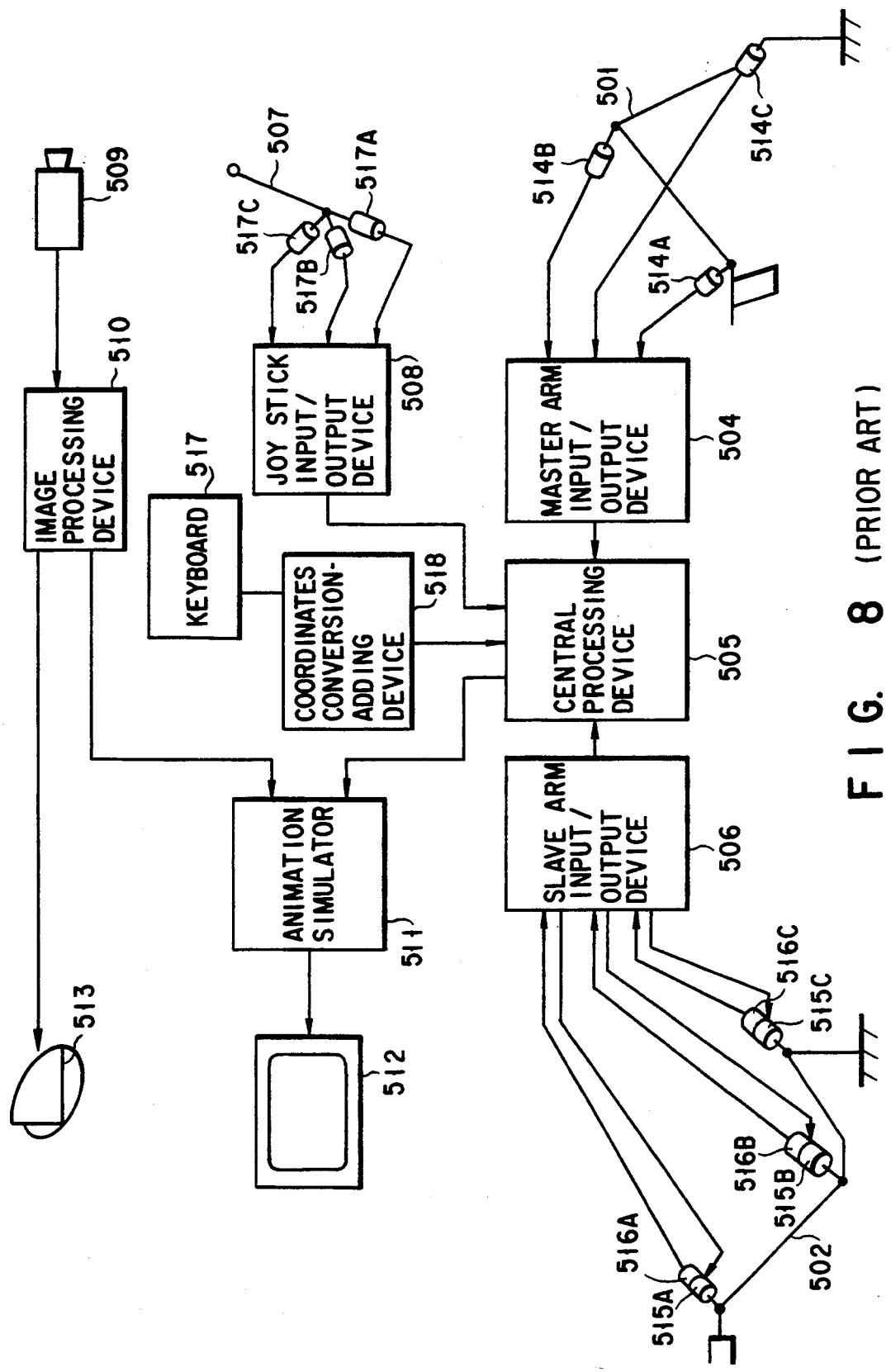
FIG. 8 is a block diagram showing a conventional master slave manipulator system.

FIG. 4 is a diagram showing the safety operation system for a robot according to the second embodiment of the present invention.

Referring to FIG. 4, numeral 50 denotes a teaching box, numeral 51 denotes an encoder incorporated inside the teaching box 50, and numeral 52 denotes a robot's main body.

The encoder 51 generates an instruction for manually operating one of the movable sections of the robot's main body 52.

Numeral 53 denotes a robot controller. The robot controller 53 processes the instructions supplied from the teaching box 50 so as to control the robot's main body 52, and causes the teaching box to display the state of the robot system.

Numeral 54 denotes an operation signal processor. The operation signal processor 54 processes the output signals of the encoder 51 so as to generate signals used for determining the rotation to the right, rotation to the left, and the presence/absence of failure.

Numeral 55 denotes a path calculation section. On the basis of the instructions entered from the teaching box 50, the path calculation section 55 executes coordinates conversion so as to move the robot's main body 52.

Typical examples of coordinates conversion include conversion for permitting the robot's main body 52 to move on the basis of rectangular coordinates, conversion for permitting the robot's main body to move on the basis of cylindrical coordinates, and conversion for permitting the movable sections of the robot's main body to move individually.

Numeral 56 denotes a servo controller. The servo controller 56 amplifies the control signals supplied from the path calculation section 55 and supplies the amplified signals to a servo motor of the robot's main body 52. In addition, the servo controller 56 receives a feedback signal from the position sensor attached to the servo motor, compares it with a control signal supplied from the path calculation section 55, and outputs a deviation signal.

Numeral 57 denotes a pulse counter used when the encoder 51 is rotated to the left, and numeral 58 denotes a pulse counter used when the encoder 51 is rotated to the right.

Numeral 59 denotes a failure detecting circuit for detecting failure by use of the method described above with reference to FIGS. 2A to 2G and FIGS. 3A to 3G.

Numeral 60 denotes a safety management section. Upon reception of an abnormal-state signal from the teaching box 50, the failure detection circuit 59, the path calculation section 55, or the servo controller 56, the safety management section 60 prohibits the robot's main body 52 from being driven or performs other operations for safety.

Numeral 61 denotes a group of keys which are classified into three types: namely, ten-key pads 62, function keys 63, and degree of freedom-switching keys 64. By operating the switching keys 64, the degree of freedom in the directions of X, Y and Z axes, for example, can be switched from one value to another. When an output signal of the encoder 51 is supplied to the path calculation section 55, one of the switching keys 64 is operated to select the degree of freedom corresponding to that output signal.

In FIG. 4, the degree of freedom is shown as being selected from among three values, but in the robot system in actual use, the degree of freedom is selectable from among six values.

Numeral 65 denotes a coordinates conversion management section. The coordinates conversion management section 65 receives a signal representing the coordinates selected by the function keys 63, and supplies an instruction to the path calculation section 55.

Numeral 66 denotes a key input determination section. The key input determination section 66 determines those key inputs which cannot be processed by the coordinates conversion management section 65, and supplies key input information to the other structural components of the robot controller 53.

Numeral 67 denotes a teaching information storage section. The teaching information storage section 67 stores information regarding the contents of teaching entered from the teaching box 50, and supplies the information to the path calculation section 55 when a playback operation is performed.

Numeral 68 denotes an emergency stop button. If an emergency occurs, the operator presses the emergency stop button 68, and a signal generated thereby is supplied to the safety management section 60, for emergency shutdown.

Numeral 69 denotes an automatic changeover switch, and numeral 70 denotes a liquid crystal display provided for the teaching box 50.

A description will now be given of the operation of the second embodiment of the above structure.

Roughly speaking, the operating modes of the robot system include a teaching mode, an automatic operating mode, and an inspection mode.

In the teaching mode, coordinates under which the robot is moved are designated by means of keys 61, and a switching position is selected by means of the freedom of degree-switching keys 64. The encoder 51 is rotated by the operator's inching operation, and pulses generated in accordance with the rotation of the encoder 51 are output from either the left-rotation counter 57 or the right-rotation counter 58. The path calculation section 55 performs coordinates conversion, and the movable sections of the robot's main body 52 are operated by instructions produced by the coordinates conversion.

The power required for operating the robot's main body is obtained by power amplification performed by the servo controller 56. The positions of the movable sections of the robot's main body 52 are sensed by the position sensors coupled directly to the movable sections. Signals representing the positions of the movable sections are fed back to the servo controller 56. The servo controller 56 compares the signals with control signals supplied from the path calculation section 55, so as to control the movement of the robot's main body 52.

In the manner described above, the robot's main body is operated in accordance with the rotation of the encoder 51.

If something is wrong with one of the A-phase and B-phase detecting elements of the encoder 51, this state is detected by the failure detection circuit 59.

When the encoder 51 is in the normal operating condition, the automatic changeover switch 69 is at position a indicated in FIG. 4. Thus, the information regarding the present position which is obtained by the calculation performed by the path calculation section 55 is displayed on the liquid crystal display 70. However, if failure is detected by the failure detection circuit 59, the automatic changeover switch 69 is automatically switched to position b indicated in FIG. 4, and the safety management section 60 controls the display 70 to show the failure condition of the encoder 51.

The safety management section 60 manages not only the failure of the encoder 51 but also the failures of the path calculation section 55 and the servo controller 56.

Upon the occurrence of failure, the safety management section 60 controls the display 70 to show the failure condition, and supplies a signal to the servo controller 56 such that the deviation signals of the servo controller 56 are made zero, thereby prohibiting the robot's main body from being driven.

If the A-phase and B-phase detecting elements of the encoder 51 fail at the same time, neither the left-rotation counter 57 nor the right-rotation counter 58 outputs pulses. Therefore, undesirable operation of the robot's main body can be prevented.

When the encoder 51 is in the normal operating state and the robot's main body 52 reaches the target position, teaching instructions are issued by operating the function keys 63. The teaching instructions are processed by the key input determination section 66, and data on the position representing the tip end of the robot's main body 52 and obtained by the path calculation section 55 is stored in the teaching information storage section 67.

In the manner described above, the robot's main body is moved and the necessary data representing the positions of the tip end of the robot's main body are successively stored. As a result, the data on the path along which the robot's main body should move in the automatic operating mode are stored.

The teaching information storage section 67 stores not only the data on the positions of the tip end of the robot's main body 52 but also data on the following: the speed at which the robot's main body 52 should move to the next target position; the state of the working tool being held by the robot's main body 52; the operating instructions supplied to the peripheral devices of the robot's main body 52; and interlocking relationships. Therefore, the robot's main body 52 operates in coordination with the peripheral devices.

The encoder 51 is provided with a shuttle. The robot's main body can be moved toward the direction selected by the freedom of degree-switching keys 64 at the speed corresponding to the angle of the shuttle.

In the automatic operating mode, the data stored in the teaching information storage section 67 are fetched in the path calculation section 55 in response to the depression of the start button of the teaching box 50. On the basis of the data fetched in the path calculation section 55, coordinates conversion is performed to obtain instructions used for moving each of the movable sections of the robot's main body 52. After being amplified by the servo controller 56, the instructions are supplied to the robot's main body 52. In this manner, the robot's main body 52 can successively operate in accordance with the data stored in the teaching information storage section 67.

In the inspection mode, the robot's main body 52 is disabled, and the operator checks the functions of the controller or the data stored in the teaching information storage section 57 by utilizing the display function of the display 70.

If, for example, the A-phase detecting element becomes out of order when the encoder 51 is rotated for an inching operation, the signals indicated by a and b in FIG. 2 are not output in spite of the rotation of the encoder 51. In this case, the failure of the A-phase detecting element can be detected by comparing signals a and b with the U-output.

Owing to the structure mentioned above, the present invention is advantageous in the points below.

According to the present invention, the display, which is constantly looked at by the operator, shows the movement or position of the manipulator. If the robot system fails to function normally, the display shows this failure. Therefore, the operator can operate the robot's main body easily and safely, and the operator's burden is reduced, accordingly.

According to the present invention, moreover, if the operating device fails to function normally, the failure is immediately detected, and the manipulator is immediately prevented from being driven. Since the manipulator does not operate in the manner not intended by the operator, the safety is ensured.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A safety operation system for a manipulator, comprising:
   first operation means, having a first movable section which moves in response to an operator's manual operation, for outputting a first operation signal representing a position and an angle of the first movable section;
   failure detecting means for detecting failure of the first operation means on the basis of the first operation signal supplied from the first operation means and for outputting a detection signal representing failure detection;
   conversion means for converting the first operation signal supplied from the first operation means into a control signal, when failure of the first operation means is not detected by the failure detecting means;
   second operation means, having a second movable section which moves in accordance with movement of the first movable section of the first operation means, for outputting a second operation signal generated in accordance with movement of the second movable section;
   comparison means for comparing the control signal supplied from the conversion means with the second operation signal supplied from the second operation means and for outputting a deviation signal used for operating the second movable section of the second operation means;
   management means, responsive to the detection signal supplied from the failure detecting means, for supplying the comparison means with a signal which makes the deviation signal zero, thereby prohibiting the second movable section of the second operation means from being driven; and
   display means for displaying at least one of data on the failure of the first operation means and data on a current position of the first movable section of the first operation means, on the basis of a signal output from the management means.

2. A system according to claim 1, wherein said display means is located adjacent to the first operation means.

3. A system according to claim 1, further comprising:
   teaching instruction generating means for generating teaching instructions; and
   teaching information storage means for storing the first operation signal from the first operation means as teaching information, in response to the teaching instructions from the teaching information generating means, thereby preparing a series of operating programs.

4. A system according to claim 3, further comprising automatic driving means for reading out the operating programs from the teaching information storage means and for permitting the second operation means to automatically operate.

5. A system according to claim 1, wherein said first operation means includes a rotatable encoder.

6. A system according to claim 5, further comprising degree of freedom-switching means for switching each of degrees of freedom of the encoder from one value to another.

7. A system according to claim 1, further comprising:
   teaching instruction generating means for generating teaching instructions; and
   accommodating means for accommodating said teaching instruction generating means, said first operation means and said display means.

* * * * *